GEORGE B. LOPER
INVENTOR.
BY D. Carl Richards
AGENT

GEORGE B. LOPER
INVENTOR.
BY D. Carl Richards
AGENT

GEORGE B. LOPER
INVENTOR.

BY D. Carl Richards
AGENT

United States Patent Office 2,722,569

Patented Nov. 1, 1955

2,722,569

REPRODUCTION OF LOW-FREQUENCY MAGNETICALLY RECORDED SIGNALS

George B. Loper, Dallas, Tex., assignor, by mesne assignments, to Socony Mobil Oil Company, Inc., a corporation of New York Application April 12, 1951, Serial No. 220,636

12 Claims. (Cl. 179—100.2)

This invention relates to the reproduction of magnetically recorded signals and more particularly to signal reproduction wherein saturation of a magnetizable element is utilized to produce signals that are independent of the signal frequency and of the velocity at which the signal storing medium is driven and dependent only upon the degree of magnetization of the signal storing medium.

In the art of magnetic recording and reproducing, it has become routine to record or store speech and other signals on a magnetic medium such as a wire or tape. The recording medium may then be driven over a reproducing head to detect the stored signals. While it has been found possible to record very low frequency signals in magnetic form, reproduction or detection of such signals has been most difficult because of the low frequency limitation associated with reproducing systems. Ordinarily, detecting systems utilize a coil magnetically coupled to the recording medium to produce a voltage that is dependent not only upon the degree of magnetization of the signal storing medium but also is dependent upon the time rate at which magnetic variations pass the detecting head. This voltage is therefore proportional to the velocity of the medium and also to the frequency of recorded signals, although degree of magnetization may be constant. In order to reproduce low frequency signals, it has been found necessary to utilize complex equalization systems to compensate for the velocity characteristic.

By the present invention, magnetically stored signals are reproduced without the necessity of such equalization since the output signals are dependent only upon the degree of magnetization of the signal storing medium.

More particularly, in accordance with one form of the invention, there is provided a system for reproducing signals stored on a magnetic medium comprising a flux path formed by two magnetic elements positioned in a spaced-apart relation as to form an air gap therebetween. The elements are adapted at a first point to receive elementary lengths of the signal storing medium in a bridging relation to produce magnetic flux in the path dependent upon the magnetization of the elementary length. A magnetometer system having a saturable magnetic filament bridges the air gap at a second point for detecting the magnitude of the flux in the path due to the elementary length of the signal storing medium bridging the air gap at the first point. Further, provision is made for limiting the flux in the air gap at the first point that is produced by operation of the magnetometer detecting system.

For further objects and advantages of the invention and for a more complete understanding thereof, reference may now be had to the following description taken in conjunction with the accompanying drawings in which.

Figure 1:
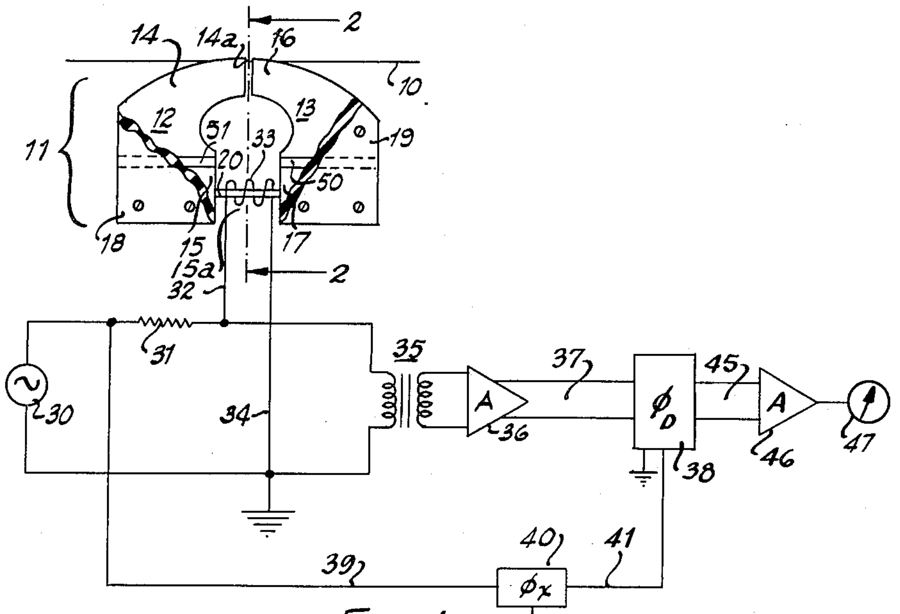
Fig. 1 illustrates one form of signal reproducing system.

Referring now to Fig. 1, there is illustrated a system for detecting signals that have been stored on a magnetizable medium such as a wire 10. The reproducing system includes a detecting head 11 consisting of two magnetic elements 12 and 13 which are shaped generally in the form of a U, having two poles. The pole 14 of the element 12 is positioned as to confront the pole 16 of the element 13 in a spaced-apart relation to provide a small air gap 14*a* therebetween. The elements 12 and 13 may be maintained in the desired spaced-apart relation by any suitable means as, for example, the nonmagnetic plates 18 and 19, shown cut away in Fig. 1, or by moulding the elements 12 and 13 into a plastic mass with only poles 14 and 16 exposed.

The elements 12 and 13 are dimensioned so that there is a second air gap 15*a*, between poles 15 and 17, which is of greater length than the air gap between the poles 14 and 16. A filament 20 of magnetic material preferably highly permeable and non-retentive is positioned in the second air gap 15*a* and forms a shunt between poles 15 and 17.

Figure 2:
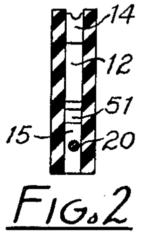
Fig. 2 is a sectional view of the reproducing head of Fig. 1 taken along the line 2—2.

The filament 20 preferably is of the form utilized in saturable core flux gate elements. The sectional view of Fig. 2 illustrates the position of the filament 20 in the lower air gap 15*a*. When magnetized portions of the recording medium 10 bridge the air gap 14*a*, magnetic flux proportional to the stored signal tends to be established in the elements 12 and 13 and filament 20. When operated in conjunction with the associated circuits, the instantaneous magnitude of the signal flux passing through the filament 20 is detected independently of the velocity of the recording medium 10 or of the frequency of the recorded signal. The circuit includes a source of alternating current 30 coupled by way of a resistor 31 and conductor 32 to a coil 33 wound on the filament 20. The return circuit is formed by the conductor 34.

Alternating current having a relatively high frequency compared to that of the recorded signal is generated by the source 30 and is applied to the coil 33 to drive the filament 20 into saturation for each positive and negative cycle of the voltage. In the absence of an external field, the flux in the detecting head 11 is all produced by current flow in coil 33.

As is well understood by those skilled in the art, when filament 20 is driven into saturation, odd harmonics of the fundamental of the output from source 30 are generated in coil 33. However, when a magnetized portion of medium 10 shunts the air gap 14*a*, even order harmonics are generated that are dependent in magnitude upon the magnetization of the shunting portion of medium 10. In operation of the system of Fig. 1 an even order harmonic voltage thus produced is utilized to produce a signal that is a faithful reproduction of the signal stored on the medium 10.

The detecting circuit for producing such a signal includes a transformer 35 whose primary is connected directly across the coil 33. The secondary of the transformer is connected to an amplifier 36 which preferably includes frequency selective means for passing only a selected even order harmonic and for rejecting all other frequencies from the system.

The selected even order harmonic, preferably the second harmonic, is transmitted by way of the conductors 37 to a phase detecting network 38. Additionally there is provided means for applying to the phase detecting network 38 a reference voltage from the source 30. More particularly, the output from the source 30 is applied to a frequency doubler 40 by way of conductor 39. The output of the doubler 40 appearing on the conductor 41 corresponds in frequency with the output of the amplifier 36.

By phase detecting the signals appearing between conductors 37 and the signal appearing between conductor 41 and ground, an output signal is produced that is dependent upon the magnitude of the second harmonic produced in coil 33. The polarity of the output signal is, at a given instant, dependent upon the direction of magnetization of the elementary length of the signal storing medium 10 shunting the air gap 14*a*. The output signal is then applied by way of conductors 45 and amplifier 46 to a measuring means generically illustrated by the meter 47. The output applied to the meter 47 may, of course, serve to actuate any of a number of devices as may possibly be required for study or utilization of a particular recorded signal.

The phase detecting network, its associated filter, amplifiers, and frequency doubler are well known and understood by those skilled in the art and for that reason are not described in detail here. For such details, reference may be had to the patent to R. A. Broding, No. 2,535,666, issued December 26, 1950, particularly Fig. 3 and the accompanying discussion. A further description of such phase sensitive circuits is found in Servomechanism Fundamentals (1947) by Lauer, Lesnick Matson (McGraw-Hill) pages 206–209.

The saturable filament 20, Fig. 1, operates as a saturable core magnetic detector of the type generically illustrated in the Patent 2,477,337 to W. E. Kahl, July 26, 1949. It will be recognized that because of excitation of the detector there is produced a magnetic field in the air gap 14*a*. If this magnetic field is strong as compared to the magnetization of the recording medium 10 due to signal storage thereon, the signal stored on the medium 10 may be erased or partially obliterated. In avoidance of such action, means are provided for minimizing the strength of the magnetic field in the air gap 14*a* due to excitation of the coil 33. More particularly, as illustrated in Fig. 1, non-magnetic bars 50 and 51 may be inserted in the flux path to form an integral part of the elements 12 and 13. When the portion of the flux path formed by the non-magnetic bars 50 and 51 approaches the reluctance of the air gap 15*a*, the leakage flux of the field produced by current flowing in coil 33 will be substantial, the effect being to lessen the flux threading the air gap 14*a* to a degree where it fails to drive the medium to saturation and does not seriously modify the recorded signal. The recording medium may then be operated over the detecting head without obliteration of the recorded signal.

Figure 3:
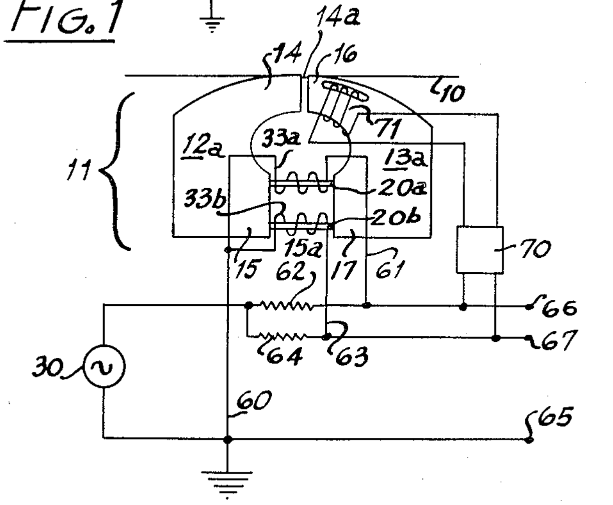
Fig. 3 is a modified form of the system of Fig. 1 and includes two saturable elements.

In Fig. 3 there is illustrated a modified detecting system in which similar parts have been given the same reference characters as in Fig. 1 with the suffix *"a."* In this system the flux threading the air gap 14*a* due to excitation of the saturable core elements 12*a* and 13*a* is reduced to practically zero. More particularly, two saturable magnetic filaments 20*a* and 20*b* are mounted as to bridge the air gap 15*a*. A first coil 33*a* is wound on the saturable filament 20*a* and a second coil 33*b* is wound on the second saturable filament 20*b*. Both coils 33*a* and 33*b* are energized from a high frequency alternating source 30, being interconnected by way of a conductor 60 electrically common to both coils and one terminal of the source 30. Separate return circuits are provided, the circuit for coil 33*a* being completed by conductor 61 and resistor 62. The return circuit from coil 33*b* is formed by conductor 63 and resistor 64. The coils 33*a* and 33*b* are wound as to produce M. M. F.'s in opposite directions as viewed in Fig. 3. Thus, there is a local flux path wherein all of the flux produced upon excitation of the coils 33*a* and 33*b* is confined. As a result there is no flux in the air gap 14*a* attributable to the excitation of source 30. A harmonic output signal produced by the presence of a magnetized wire or tape shunting air gap 14*a* may then be detected from either coil 33*a* or 33*b*, th output signal appearing between the ground terminal 65 and either output terminal 66 or 67.

It will be noted that the detector illustrated in Fig. 3 operates on the principle that the source of flux in the local flux path, i. e., coils 33*a* and 33*b*, are identical sources. They remain identical in operation so long as there is no external field in the system, i. e., so long as the magnetizable storing medium 10 does not introduce flux into the members 12*a* and 13*a*. However, the sources 33*a* and 33*b* are not identical when an external field is applied to air gap 14*a*. Thus a varying M. M. F. having harmonics of the frequency of source 30 will appear in air gap 14*a*. To null or cancel the latter field, the signal may be detected as it appears between the output terminals 66 and 67, amplified, and phased by means generically represented by the block 70. The amplified output may then be applied to an auxiliary coil 71 to produce an M. M. F. in the flux path opposite in sense to the M. M. F. produced by reason of non-identical sources as is the case when an external magnetic field is introduced into the system. Thus the system illustrated in Fig. 3 produces output signals that are dependent only upon the degree of magnetization of the element 10 with a high sensitivity and without introducing a deleterious effect on the signal storing medium 10.

Figure 4:
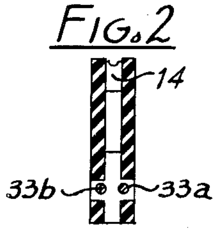
Fig. 4 is a sectional view of a modified form of the detecting head of Fig. 3.

In Fig. 3 the saturable filaments 20*a* and 20*b* are illustrated as being spaced vertically in air gap 15*a*. Fig. 4 illustrates a cross-sectional view of a modified structure which operates the same as the detector of Fig. 3. The elements 33*a* and 33*b* are illustrated in equal spaced positions from air gap 14*a*. By this means it may be further assured that the sources 33*a* and 33*b* are identical for operation as above described.

In instances when weak signals are stored on the magnetic medium 10, the system of Fig. 4 will be preferred. Where slight differences in the character of the saturable core magnetometer sources 20*a* and 20*b* may be tolerated, the configuration illustrated in Fig. 3 may be found to be suitable. In either case, however, the reaction of the operation of the magnetometer on the signal storing medium 10 is negligible.

Figure 5:
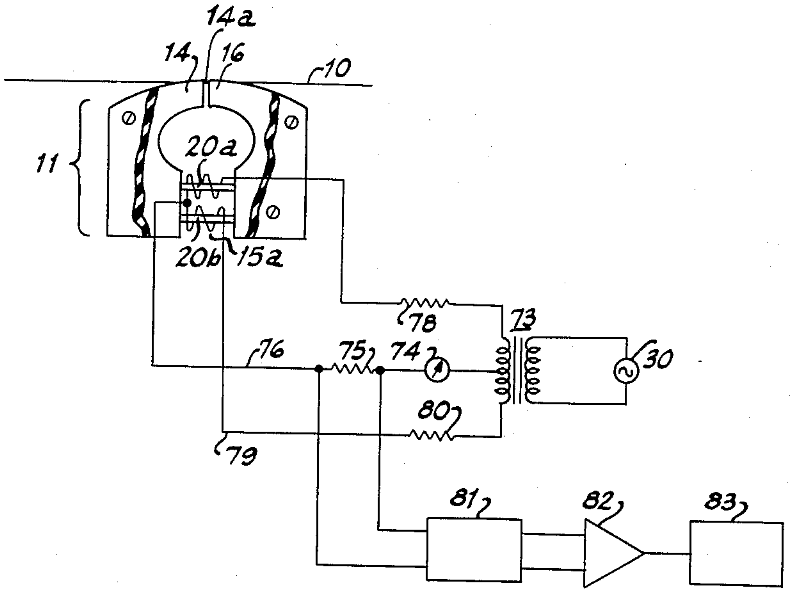
Fig. 5 illustrates a circuit for operating the device of Fig. 3 or 4 in a bridge circuit.

Fig. 5 illustrates a further modification of the invention utilizing two saturable core filaments 20*a* and 20*b* in a double circuit. The windings on filaments 20*a* and 20*b* form portions of adjacent arms of the double circuit, which also includes the secondary winding of a transformer 73. The transformer 73 has its primary winding connected to a source of alternating current 30. The secondary winding of transformer 73 is center tapped and connected by way of a meter 74, an output impedance 75, and conductor 76 to a common junction between the windings on filaments 20*a* and 20*b*. The winding on filament 20*a* is connected by way of resistor elements 78, preferably a non-linear impedance, to one extremity of the secondary winding of transformer 73. The other terminal of the winding on the filament 20*b* is connected by way of conductor 79 and non-linear resistance element 80 to the other extremity of the secondary winding of transformer 73. As long as no external field is applied to the detector 11, there is zero output voltage across resistor 75. Introduction of an M. M. F. across air gap 14*a* will produce a voltage appearing across the resistor 75. The output voltage may then be fed to a filter 81 to remove carrier frequencies, then to amplifier 82, and to recording-measuring or observing apparatus 83. The non-linear impedances 78 and 80 amplify the differences in the signals produced by elements 20*a* and 20*b* when an external field is applied.

Figure 6:
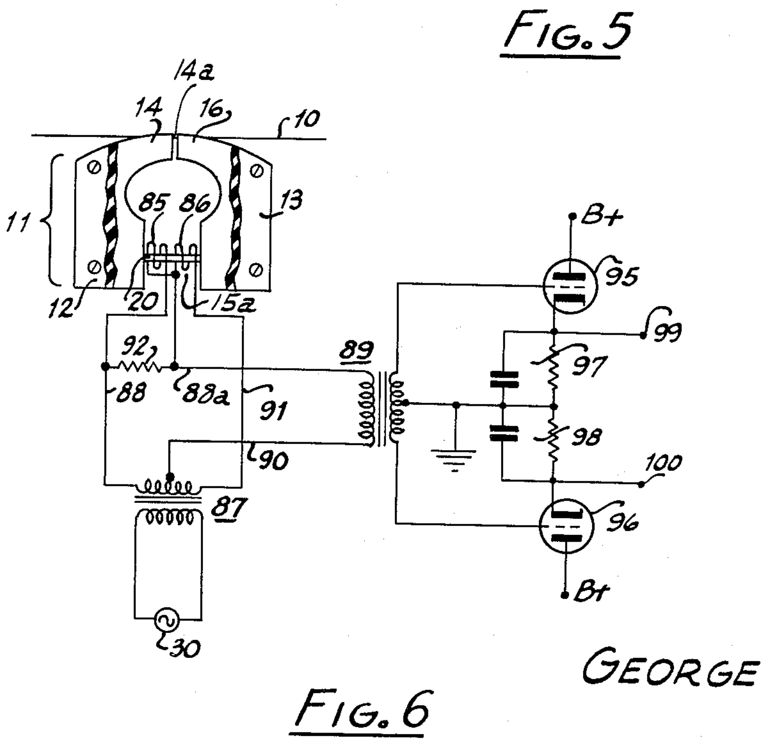
Fig. 6 illustrates a differential pulse producing detector system.

In Fig. 6 there is illustrated a detector system which includes a differential pulse producing detector system. In this system two windings 85 and 86 are placed on a single saturable filament 20 which bridges one of the air gaps between the members 12 and 13. The windings 85 and 86 are oppositely poled so that in the absence of an external magnetic field, the total magnetic field across the ends of filament 20 is zero. Even though the field across air gap 14*a* is zero there are portions of the filament that are driven into saturation by excitation of the windings 85 and 86 from source 30. More particularly, the secondary winding of a transformer 87 is connected by way of conductor 88 to one terminal of the winding 85, the other terminal of winding 85 being connected by way of conductor 88*a*, secondary winding of transformer 89, and conductor 90 to the center tap on transformer 87. Similarly, the other extremity of the secondary winding of transformer 87 is connected by way of conductor 91 through winding 86 to conductor 88*a*.

A resistance 92 is connected across the winding 85 to modify the impedance thereof as compared to winding 86. Absent an external field, the net output of the detector as it appears across the primary winding of transformer 89 is zero. More particularly, for each positive and negative cycle of voltage from the source 30, windings 85 and 86 drive localized portions of the filament 20 to saturation. Since the net impedance of winding 85 with its parallel connected resistor 92 is different than that of winding 86 alone, the portion of filament 20 magnetized by current flowing in winding 86 reaches saturation before that portion magnetized by flow of current in winding 85. As a result, upon reaching saturation, the impedance of coil 86 immediately drops to a lower value at a time in each half cycle prior to the corresponding drop in the impedance of winding 85. The resultant sum of the voltages across the two elements is a series of positive and negative pulses. One pulse is produced for each positive peak of the voltage from source 30. An equal pulse of opposite polarity is also produced for each negative peak of the voltage from source 30. When an M. M. F. is introduced in air gap 14*a* the balance is upset with the effect that the pulse produced in the positive half cycle is different, either larger or smaller, than the pulse produced in the second half cycle, depending upon the direction of the M. M. F. applied to the detector. The pulses thus produced may be applied by way of the secondary winding of transformer 89 to the grids of triodes 95 and 96. With a suitable B-supply connected between the anodes of tubes 95 and 96 and ground, the net difference between the pulses produced in detector 11 will appear across the cathode resistor-capacitor networks 97 and 98. The output appears at terminals 99 and 100 which are connected directly to the cathodes of tubes 95 and 96.

Figures 7, 8:
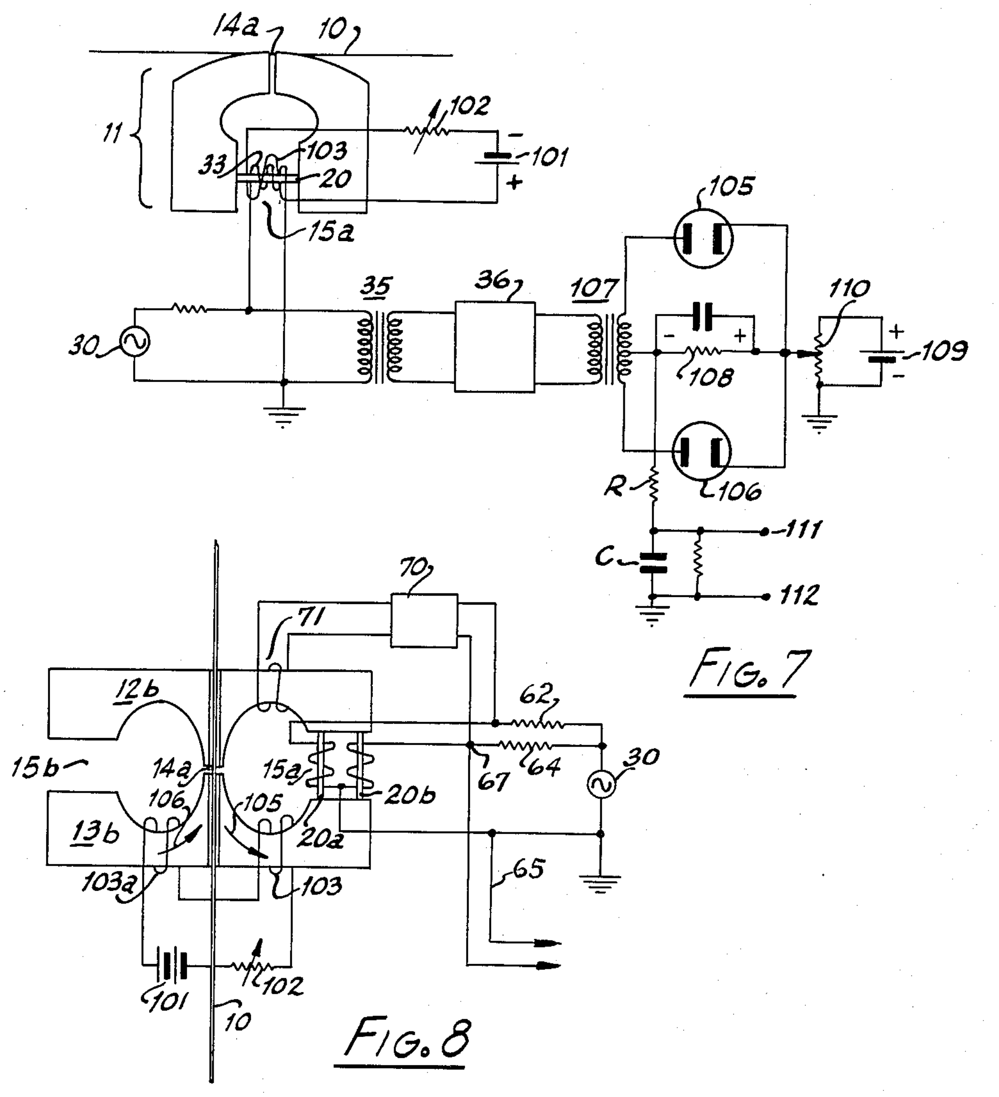
Fig. 7 illustrates operation with direct current biasing of the reproducer.
Fig. 8 is a modification of the system of Fig. 7.

In Fig. 7 there is illustrated a system similar to the detector system of Fig. 1. However, operation of this system is modified by application of a unidirectional magnetic field. This field is produced by flow of current from battery 101 through a control resistor 102 and an auxiliary winding 103 on the filament 20. The winding 33 is excited from the source 30 to drive the filament 20 to saturation on each half cycle. However, the instant in each half cycle the filament 20 reaches saturation depends upon the magnitude of the M. M. F. due to current flow from battery 101. This, in effect, introduces a D. C. or unidirectional bias in the operation of the system so that there is produced an even order harmonic voltage across the output transformer 35 independently of a signal storing medium in shunt to the air gap 14*a*. Thus upon introduction of an external magnetic field, as by a magnetized portion of the signal storing medium 10 adjacent the detector 11, the magnitude of the even order harmonics will change from the biased level to a different level dependent upon strength of the external field. A suitable amplifier or filter 36 may be provided to select one of the even order harmonics for measurement. For example, the measuring system may comprise a balanced rectifier circuit including tubes 105 and 106 for rectifying the selected harmonic signal. The net rectifier output voltage appears across the resistor 108 connected between the cathodes of the rectifiers 105 and 106 and the center tap of transformer 107. As indicated by the polarity markings, the cathode side of the resistor 108 is positive whereas the anode side is negative. This voltage is a combination of a steady component of rectified second harmonic produced by the bias field and signal variations superimposed thereupon as produced by variations of the magnetization of medium 10. The steady or bias component may be balanced out by the auxiliary circuit including battery 109 and potentiometer 110. The balance may be obtained by removing from the detector 11 any external field and balancing the voltage between the tap on potentiometer 110 and ground against the voltage across resistor 108. Thereafter the sum of the voltages across resistors 108 and 110 will be due to an external field such as that set up by medium 10 and may be filtered as by the R-C combination. The signal output voltage then appears between the output terminals 111 and 112.

Fig. 8 illustrates a modification of the invention which combines certain features illustrated in the system of Figs. 3 and 7. Corresponding parts have been given the same reference characters as in the previous figures. Elements 12*b* and 13*b*, each having three polar extensions, are spaced apart whereby the air gap 14*a* is maintained between the intermediate polar extension. A second air gap 15*a*, longer than the air gap 14*a*, is bridged by the filaments 20*a* and 20*b*. The source 30 excites coils wound around elements 20*a* and 20*b* by way of circuits including resistors 62 and 64. Thus, excitation flux is produced in a local flux path formed by elements 20*a* and 20*b* of magnitude sufficient to saturate elements 20*a* and 20*b* on each cycle of the voltage from source 30. The operation of the system thus far is the same as that of Fig. 3. The unit 70 is provided for feedback of a voltage to apply a magnetomotive force to the coil 71 to buck out or eliminate from the air gap 14*a* flux that might be generated due to difference in the characteristic operation of the filaments 20*a* and 20*b* when signal flux from the recording medium 10 is present in the system.

There is further provided biasing means for shifting the operation to a preferred point as explained in connection with Fig. 7 without introducing a unidirectional field in the air gap 14*a*. Current from battery 101 flows by way of resistor 102 through coil 103 and coil 103*a*. Coil 103 is wound around an arm of element 13*b* at a point intermediate air gaps 14*a* and 15*a*. Coil 103*a* similarly is wound around an arm of element 13*b* at a point between air gap 14*a* and a third air gap 15*b*. Air gaps 15*a* and 15*b* are so dimensioned that their reluctances are equal. Air gap 15*b* will therefore be shorter in length than gap 15*a* since gap 15*a* is bridged by filaments 20*a* and 20*b*. By this means the filaments 20*a* and 20*b* have applied thereto a unidirectional bias for operation as explained in connection with Fig. 7, at the same time preventing modification or alteration of the magnetization of the recording medium 10. It will be apparent that when current flow in coil 103 tends to establish magnetic flux in path 14*a* having a direction indicated by the arrow 105, current flow through coil 103*a* will tend to establish an equal and opposite flux in path 14*a*, the direction of which is indicated by arrow 106. As a result the air gap 14*a* is maintained free of unidirectional flux from coils 103 and 103*a*. Such a result follows since the reluctance of the path of flux from coil 103*a* and including air gap 15*b* is equal to the reluctance of the path for flux from coil 103 and including the saturable members 20*a* and 20*b*. With the reluctances equal, there will not be produced any difference in magnetic potential or magnetomotive force across the air gap 14$a$ and it is the lack of such a magnetic potential across that air gap from coils 103 and 103$a$ which prevents appearance in such gap of the unidirectional flux from said coils. Stated differently, the air gap 15$b$ provides a preferential local path for the unidirectional flux in avoidance of air gap 14$a$.

Because of the unidirectional bias in the magnetization of the filaments 20$a$ and 20$b$ there will be produced at the output points, for example, point 67, an even order harmonic voltage when the filaments 20$a$ and 20$b$ are excited by a voltage of fundamental frequency from source 30. The magnitude of this even order harmonic voltage may then be made to vary in accordance with flux introduced into the detecting system by reasons of the presence of elemental lengths of the recording medium 10 bridging the air gap 14$a$.

It will be seen from the foregoing explanation of the present invention that low frequency signals recorded on a magnetic medium may readily be reproduced or detected for measurement, analysis, or other study. The detected signal is dependent only upon the degree of magnetization of the recording medium and is wholly independent of the velocity with which the medium is driven past the recording head and of the frequency of the recorded signals. The complex equalization systems required by prior art devices for accomplishing the same result is eliminated.

While particular embodiments of the invention have been shown, it will be understood that other modifications will now be apparent to those skilled in the art. It is therefore intended to cover any such modifications as fall within the scope of the appended claims.

What is claimed is:

1. A system for reproducing signals stored on a magnetic medium comprising a flux path formed by two magnetic elements having confronting polar portions positioned in a spaced apart relation to form two air gaps, a filament of saturable magnetic material bridging the first of said air gaps and having windings thereon, a source of alternating current of fundamental frequency to drive said filament into saturation at said fundamental frequency and to produce even order harmonic voltages in the windings proportional to the magnetization of elemental lengths of said magnetic medium when placed in magnetic shunting relation to the second of said air gaps, and circuit means for detecting the magnitude of said even order harmonic voltages.

2. A system for reproducing signals stored on a magnetic medium comprising two magnetic elements spaced apart with an air gap therebetween to form a first flux path and which are adapted at a first point to receive said magnetic medium in shunting relation to said air gap to produce signal flux in said path dependent upon the magnetization of said medium, a local flux path including saturable magnetic filament means bridging said air gap at a second point displaced from said first point, excitation means for producing magnetic flux to saturate said filament means, means for producing leakage of said excitation flux between said first and second points thereby to shield said first point from said excitation flux and means for measuring variations in the saturation of said filament due to said signal flux.

3. A system for reproducing signals stored on a magnetic medium comprising two magnetic elements spaced apart with an air gap therebetween to form a first flux path and which are adapted at a first point to receive said magnetic medium in shunting relation to said air gap to produce signal flux in said path dependent upon the magnetization of said medium, a local flux path including saturable magnetic filament means bridging said air gap at a second point displaced from said first point, excitation means for producing magnetic flux to saturate said filament means, a non-magnetic insert in each of said elements between said first and second points to produce leakage of said excitation flux thereby to shield said first point from said excitation flux and means for measuring variations in the saturation of said filament due to said signal flux.

4. A system for reproducing signals stored on a magnetic medium comprising a first flux path formed by a pair of magnetic elements spaced apart with an air gap therebetween adapted at a first point to receive elemental lengths of said magnetic medium in bridging relation to produce signal flux in said first path proportional to the magnetization of said elemental lengths, a local flux path including two identical saturable magnetic filaments bridging said air gap at a second point displaced from said first point, excitation means for producing identical saturating magnetic fields in said filament means that are additive in said local flux path and opposed in said first flux path, means for measuring variations due to said signal flux in the saturation of said filaments, and a feedback system including a coil inductively coupled to said magnetic elements between said points for applying to said first path a magnetic field corresponding with the differences in saturation of said filaments due to said signal flux.

5. A system for reproducing signals stored on a magnetic medium comprising a first flux path formed by a pair of magnetic elements spaced apart with an air gap therebetween adapted at a first point to receive elemental lengths of said magnetic medium in bridging relation to produce signal flux in said first path proportional to the magnetization of said elemental lengths, a local flux path including a pair of saturable magnetic filaments each bridging said air gap at a second point displaced from said first point, excitation means for producing magnetic flux to saturate said filaments, means for measuring variations due to said signal flux in the saturation of one of said filaments, a coil inductively coupled to said magnetic elements between said points and a signal amplifying channel responsive to the difference in output of said filaments for applying to said coil currents to cancel flux at said first point due to differences in saturation of said filaments caused by said signal flux.

6. A system for reproducing signals stored on a magnetic medium comprising a flux path formed by a pair of magnetic elements spaced apart with an air gap therebetween adapted at a first point to receive elemental lengths of said magnetic medium in bridging relation for production of signal flux in said first path proportional to the magnetization of said elemental lengths, a saturable magnetic filament bridging said air gap at a second point displaced from said first point, two coils wound to said filament at spaced locations, a source for alternating current connected to said coils to apply to said filament two magnetic fields of instantaneously opposed directions to saturate said filament at said locations, an impedance connected in circuit with one of said coils for modifying the saturation characteristic of one of said locations with respect to the other, and means connected to said coils for measuring the difference in saturation of said filament at said locations due to said signal flux.

7. A system for reproducing signals stored on a magnetic medium comprising a flux path formed by a pair of magnetic elements spaced apart with an air gap therebetween adapted at a first point to receive elemental lengths of said magnetic medium in bridging relation for production of signal flux in said first path proportional to the magnetization of said elemental lengths, a saturable magnetic filament bridging said air gap at a second point displaced from said first point, a pair of coils inductively coupled to said filament, a source of alternating current differentially connected to said coils for applying two magnetic fields of opposed directions to said filament for saturating said filament at two locations along its length, an impedance connected in circuit with one of said coils for modifying the saturation characteristic of one of said locations with respect to the other, and means connected to said coils for measuring the difference in saturation of said filament at said two locations due to said signal flux.

8. A system for reproducing signals stored on a magnetic medium which comprises a first flux path formed by a pair of magnetic elements spaced apart with an air gap therebetween adapted at a first point to receive elemental lengths of said magnetic medium in bridging relation for production of signal flux in said first path proportional to the magnetization of said elemental lengths, a local flux path including saturable magnetic filament means in said air gap at a second point displaced to one side of said first point, a high frequency alternating current source inductively coupled to said filament means for producing saturating excitation flux therein for the production of harmonic voltages proportional to signal flux in said first path, said elements having extensions forming a third path for unidirectional flux, means for applying a unidirectional magnetic field in said local flux path and exclusive of said first point which includes a direct current source and a coil wound on said magnetic elements on opposite sides of said first point to bias the saturation of said saturable magnetic filament means, and means for measuring variations in saturation of said filament means by said signal flux.

9. A system for reproducing signals stored on a magnetic medium comprising magnetic structure forming a main flux path with an air gap therein at a first point adapted to be bridged by elemental lengths of said magnetic medium to produce signal flux in said main path proportional to the magnetization of said elemental lengths, said magnetic structure having a local flux path at a second point displaced from said first point comprising two magnetically saturable members forming a limited length of the main flux path, excitation means for producing in said members identical magnetic fluxes of saturating density and which are additive in said local flux path, the passage of a magnetized elemental length of said medium in bridging relation with said air gap producing signal flux in said main path which at said second point produces unequal fluxes through said magnetically saturable members, and a feedback system including a coil inductively associated with said main flux path for producing a magnetomotive force acting in a direction to cancel flux which would otherwise tend to appear at said gap due to said flux inequality through said magnetically saturable members.

10. A system for reproducing signals stored on a magnetic medium comprising magnetic structure forming a main flux path with an air gap therein at a first point adapted to be bridged by elemental lengths of said magnetic medium to produce signal flux in said main path proportional to the magnetization of said elemental lengths, said magnetic structure having a local flux path at a second point displaced from said first point comprising two magnetically saturable members forming a limited length of the main flux path, excitation means for producing identical saturating magnetic fluxes in said members which are additive in said local flux path, the passage of a magnetized elemental length of said medium in bridging relation with said air gap producing signal flux in said main path which at said second point produces unequal fluxes through said magnetically saturable members, and a feedback system responsive to inequality between said saturating fluxes including a coil inductively associated with said main flux path for producing a magnetomotive force acting in a direction to cancel flux which would otherwise tend to appear at said gap due to said flux inequality through said magnetically saturable members.

11. A system for reproducing signals stored on a magnetic medium comprising a magnetic structure forming a main flux path with an air gap therein at a first point adapted to be bridged by elemental lengths of said magnetic medium to produce signal flux in said main path proportional to the magnetization of said elemental lengths, said magnetic structure having a local flux path at a second point displaced from said first point comprising two magnetically saturable members forming a limited length of said main flux path, high-frequency exciting means inductively associated with said members for producing high-frequency excitation flux therein of saturable density, the passage of a magnetized elemental length of said medium in bridging relation with said air gap producing signal flux in said main path which at said second point produces unequal fluxes through said magnetically saturable members and thereby produces harmonic voltages proportional to the magnitude of said signal flux, means located on opposite sides of said air gap for producing a unidirectional magnetic flux through said local flux path, said magnetic structure including a flux path at a third point having a reluctance which in relation to the reluctance of said local path provides a preferential flux path for said unidirectional flux in avoidance of said air gap, and means for measuring inequality in the fluxes through said magnetically saturable members.

12. A system for reproducing signals stored on a magnetic medium comprising a magnetic structure forming a main flux path with an air gap therein at a first point adapted to be bridged by elemental lengths of said magnetic medium to produce signal flux in said main path proportional to the magnetization of said elemental lengths, said magnetic structure having a local flux path at a second point displaced from said first point comprising two magnetically saturable members forming a limited length of said main flux path, high-frequency exciting means inductively associated with said members for producing high-frequency excitation flux therein of saturable density, the passage of a magnetized elemental length of said medium in bridging relation with said air gap producing signal flux in said main path which at said second point produces unequal fluxes through said magnetically saturable members and thereby produces harmonic voltages proportional to the magnitude of said signal flux, means located on opposite sides of said air gap for producing a unidirectional magnetic flux through said local flux path, said magnetic structure including a flux path at a third point having a reluctance which in relation to the reluctance of said local path provides a preferential flux path for said unidirectional flux in avoidance of said air gap, means for measuring inequality in the fluxes through said magnetically saturable members, and a feedback system including a coil inductively associated with said main flux path for producing a magnetomotive force acting in a direction to cancel flux which would otherwise tend to appear at said gap due to said flux inequality through said magnetically saturable members.

References Cited in the file of this patent

UNITED STATES PATENTS

| | | |
|---|---|---|
| 2,328,478 | Mason | Aug. 31, 1943 |
| 2,477,337 | Kahl | July 26, 1949 |
| 2,536,260 | Burns | Jan. 2, 1951 |
| 2,608,621 | Peterson | Aug. 26, 1952 |